Aug. 15, 1939.  T. TURCHENKO  2,169,858
COMBINED VEHICLE AND BEEHIVE
Filed April 3, 1937  2 Sheets-Sheet 1

INVENTOR
THEODORE TURCHENKO
BY
ATTORNEY

Aug. 15, 1939.   T. TURCHENKO   2,169,858
COMBINED VEHICLE AND BEEHIVE
Filed April 3, 1937    2 Sheets-Sheet 2
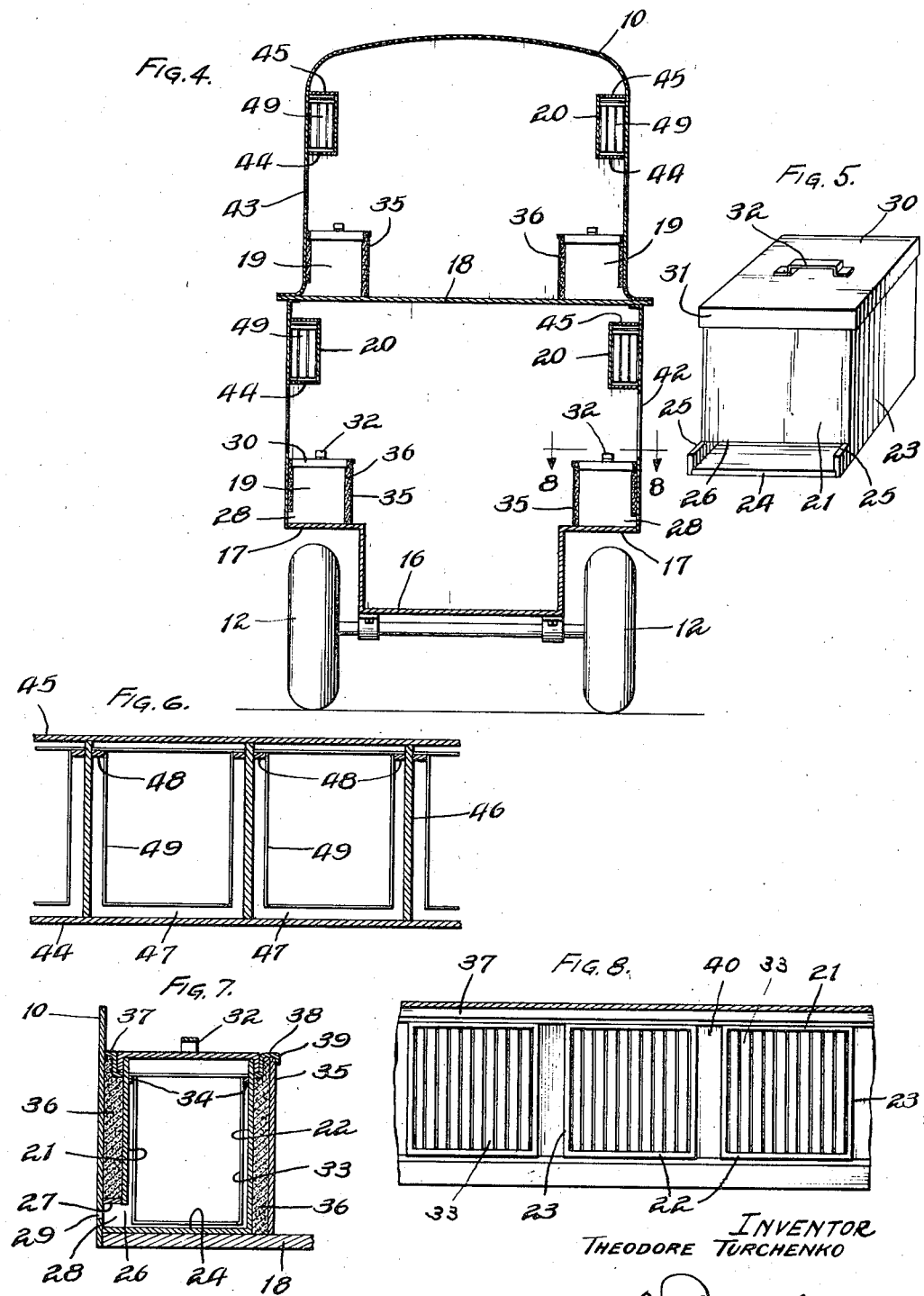
INVENTOR
THEODORE TURCHENKO
BY [signature]
ATTORNEY Patented Aug. 15, 1939

2,169,858

UNITED STATES PATENT OFFICE 2,169,858

COMBINED VEHICLE AND BEEHIVE

Theodore Turchenko, Lisle, Ill.

Application April 3, 1937, Serial No. 134,816

5 Claims. (Cl. 6—12)

In apiculture it is of a frequent occasion that due to various conditions such as weather and growing communities and consequent diminution of honey productive fields, the bees are unable to find sufficient nectar not only for the purpose of creating a surplus of honey but for the purpose of their normal sustenance as well. In some localities there may be an appalling lack of nectar for normal honey production purposes while simultaneously in other localities the supply thereof may be over-abundant. Large apiaries located in the suburbs of large cities are eventually destined for complete destruction due to the gradual growth of the cities and suburbs and consequent gradual decrease of the honey producing fields. In many cases it becomes necessary for apiculturists to move their apiaries to more outlying districts.

Therefore, the principal object of the present invention is the provision of a vehicle wherein any number of beehives may be positioned to facilitate their transportation from the fields of scarcity into the fields of more abundant supply of nectar.

A still further object of the present invention is the provision of a transportable means for beehives which would facilitate apiculture and would in a great many cases do away with the necessity of owning land upon which to maintain beehives, because by the use of the present device a person without having a permanent abode or without owning land upon which to engage in apiculture may travel from place to place and may conduct the art of producing honey while travelling.

A still further object of the present invention is the provision of a beehive which would be most adaptable in combination with a vehicle.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views;

Fig. 4 is a transverse cross-sectional view taken on line 4—4 of Fig. 1;

Fig. 5 is a perspective view of one of the beehives when removed from the vehicle;

Fig. 6 is a longitudinal cross-sectional view through one series of beehives, the view having been taken on line 6—6 of Fig. 2;

Fig. 7 is a cross-sectional view through one of the beehives of another series, the view having been taken on line 7—7 of Fig. 3; and Fig. 8 is a cross-sectional view on a horizontal plane through a number of beehives of one series, the view having been taken on line 8—8 of Fig. 4.

Figure 1:
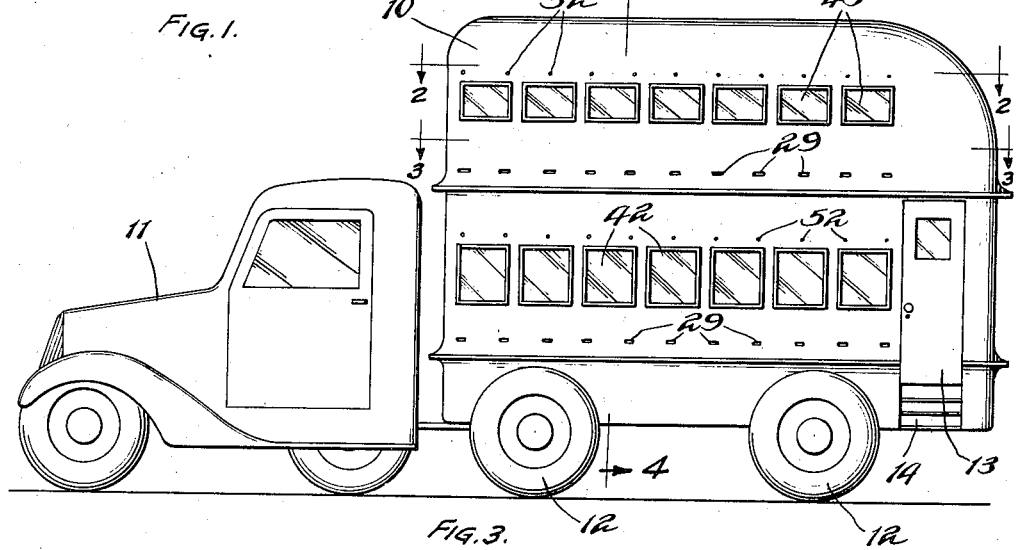
Fig. 1 is a side elevational view of a beehive transporting vehicle.

Referring in detail to the present drawings there is shown therein a vehicle of the trailer type indicated by 10 attached to a truck cab or a family automobile 11 which provides a motive power for the trailer portion 10.

The trailer portion of the vehicle within which a plurality of beehives are positioned, includes a number of wheels 12 upon which the same is adapted to travel upon the ground.

The trailer 10 may be made into floors or decks, the lower deck at its rearward end is provided with door 13 and steps 14 affording access to the lower deck of the trailer, while stairway 15 is provided to afford access to the upper deck of the trailer.

The lower deck of the trailer includes a longitudinal central passage way 16 and has the resulting side ledges 17, overhanging wheels 12, upon which ledges a plurality of one series of beehives are adapted to be positioned.

The trailer further includes a partition wall 18 which constitutes a ceiling for the lower deck and a floor for the upper deck of the trailer.

Positioned upon ledges 17 and upon floor 18 are rows of beehives of one series arranged longitudinally on each side of the trailer as generally indicated by 19. Attached to the side walls of the trailer at the upper portions of the lower and upper decks of the trailer are beehives of another series, likewise arranged lengthwise of the trailer and adjacent the side walls thereof, as generally indicated by 20 upon Fig. 4.

Referring more specifically to the beehive rows 19, each beehive used in connection therewith includes front wall 21, rear wall 22, side walls 23 and bottom wall 24. These walls define a substantially rectangular box-like structure, best shown on Fig. 5. Portions of side walls 23 adjacent the lower ends of said walls are brought forward to define extensions 25. The bottom wall 24 is likewise extended and terminates with the ends of said extensions 25 to define a trough as seen on Fig. 5. The front wall 21 has its lower edge resting upon said extensions 25 thus providing an opening 26. Each of said beehives is further provided with ledge 27 which is adapted to rest upon the upper edges of extensions 25. Thus it will be seen that the front end of bottom wall 24, said extensions 25 and ledge 27 define a chute 28 which communicates with the opening 26, both of which afford access to the hive for the bees. Chute 28 of each beehive, when positioned either upon ledge 17 or on floor 18, as the case may be, communicates with a slot 29 made in the side walls of trailer 10 which affords entrance or egress for the bees into or out of the hive.

Each of the beehives hereinabove described is further provided with lid 30 with downwardly depending flange 31 which is adapted to laterally overhang the upper edges of walls 21, 22 and 23. Handle 32 on each lid 30 facilitates manual lifting or placing of the lid off or on the hive.

Each of the said beehives is to contain a plurality of honey comb frames 33, each of which is suspended by its top upon cleats 34. These frames 33 may preferably be in transverse relation with the trailer.

Figure 3:
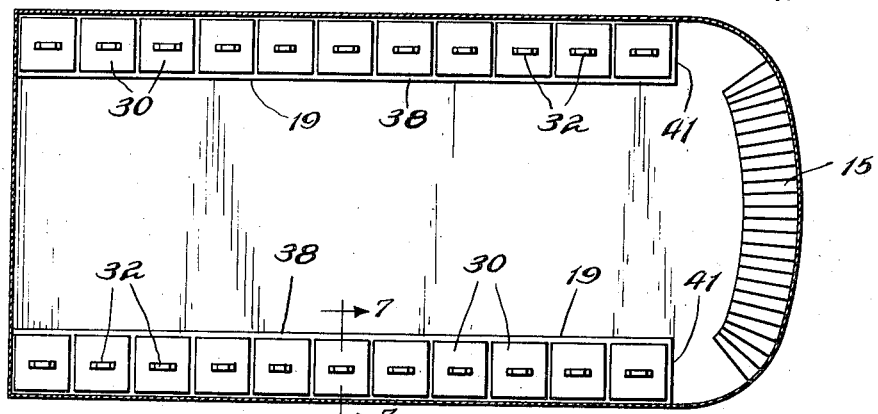
Fig. 3 is an enlarged cross-sectional view on the horizontal plane of line 3—3 of Fig. 1.
Figure 2:
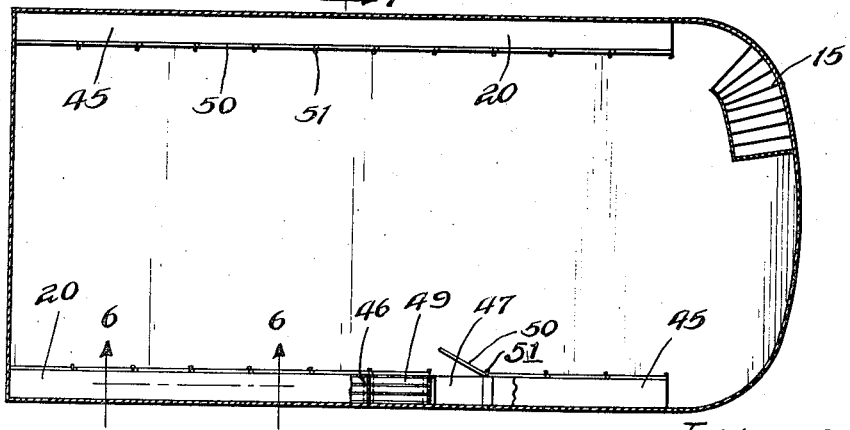
Fig. 2 is an enlarged cross-sectional view on the horizontal plane of line 2—2 of Fig. 1.

The said beehives of series 19, hereinabove described, are, in their operative position within trailer, spaced from each other as is clearly seen on Figs. 3 and 8. Likewise they are spaced from the side walls of the trailer. Each of the rows of the hives of series 19 is further provided with board 35 which is in spaced relation with the rear walls of the beehives. The spaces between the beehives, the spaces defined by the front wall of the beehive and the trailer wall as well as the space defined by board 35 and the rear walls of the beehives are all filled with sawdust 36, for the purpose of insulating the hives both from severe cold as well as high temperature and to preserve normal and suitable temperature within each of the hives. Since chute 28 contacts by its mouth the adjacent wall of the trailer 10 no particles of sawdust can enter the beehives.

Positioned upon the sawdust in the spaces defined by the front wall 21 and the trailer wall is a substantially S-shaped angle bar 37 which, by its raised portion contacts the trailer wall and by its lower portion contacts the front walls 21 of the beehives and by its shape defines a space within which the adjacent front portion of flange 31 is adapted to fit.

A similar angle bar 38 is provided at the rear ends of the beehives and is likewise suitably molded to define a space between its body portion and the adjacent upper end of rear wall 22 for the purpose of defining the slot within which the adjacent portion of flange 31 may fit when the lid is in closed position upon the beehive. Said angle bar 38 has a downwardly depending lip 39 which overhangs the top edge of board 35, and constitutes a mounting means for said angle bar 38 upon said board 35 and further provides means for preventing any sawdust from working its way or escaping from under said angle bar 38 and outwardly of the board 35.

For covering the sawdust remaining within the spaces defined by side walls 23 of the hives are boards 40 which may extend below the adjacent edges of angle bars 37 and 38.

It is understood that boards 35 as well as angle bars 37 and 38 run the entire length of each of the rows of beehives of series 19.

The end hives of series 19 adjacent the rear end of trailer 10 may be enclosed adjacent one of its side walls by transverse boards 41 transversely positioned between the walls of trailer and boards 35.

From the hereinabove description it will be seen that each of the beehives of series 19 is for all intents and purposes a separate unit, excepting of course the arrangement of sawdust packing and means for holding a plurality of said hives in a rigid position with respect to the trailer body, including boards 35 and angle bars 37 and 38. This for the purpose that in the event a disease should set in in any particular hive, the same may be removed from its relative position with respect to other hives, and destroyed or disinfected.

Each deck of trailer 10 is provided with a series of windows 42 and 43 which are above the respective hive rows of series 19.

Referring to the series 20 of the beehives the same are positioned longitudinally of the trailer, on each side thereof above windows 42 and 43 and adjacent the upper portions of the lower and upper decks of the trailer. Each row of series 20 of the hives includes bottom wall 44 and top wall 45, which are common to all the hives of each row of series 20 of the hives. Said bottom wall 44 and top wall 45 are connected by a plurality of spaced upright partition walls 46, and these in turn in conjunction with said bottom wall 44, top wall 45 and the adjacent side wall of trailer 10 define individual hives 47. Each of said individual hives 47 adjacent the upper ends of said partition walls 46 have cleats 48 upon which honey comb frames 49 are suspended. These frames 49 are preferably arranged in longitudinal relation with respect to trailer 10. Each of said individual hives 47 is provided with door 50 suspended upon hinges 51 through which access is provided to each hive 47 and through which frames 49 may be placed or removed from the hive.

In the side walls of trailer 10 a plurality of openings 52 is made, one in communication with each of said hives 47 adjacent the lower end thereof, for the purpose of providing entrance and egress for the bees into and out of the hive.

While hives of series 19 are primarily designed for the purpose of honey making, hives 47 are designed for bee queen and nucleus raising purposes.

Closures, common to all the hives or individual for each of openings 29 or 52 may be provided for maintaining the beehives closed while trailer 10 is on the road.

Trailer of the design indicated would have sufficient space within which various apicultural equipment may be stored and carried. Likewise sleeping and living quarters may be provided for the operator within one or the other deck of the trailer.

From the hereinabove description it will be seen that the invention herein disclosed could provide an excellent livelihood means for any sociologically inclined person, without an unduly large original investment and without any large continuing overhead expense. The invention herein disclosed may be utilized as an independent facility for bee and honey raising purposes or the same may be employed to great advantage in connection with the established and permanently located apiaries. A trailer such as herein disclosed may be used in connection with small or large number of hives and the same may be of various types and designs.

While there is described herein a preferred embodiment of the present invention, it is nevertheless to be understood that minor changes may be made therein without departing from the spirit and scope of the invention as claimed.

What I claim as new is:

1. In combination with a structure including a floor and a side wall extending upwardly therefrom, a plurality of beehives arranged in a row upon said floor and adjacent said wall, said beehives being in spaced relation with each other and spaced from said wall, a board extending from said floor and in spaced relation with said beehives, packing between the beehives, between the beehives and said wall and between the said board and said beehives, and chutes extending from the faces of each of said beehives adjacent said wall and in contact with said wall, said wall being provided with a plurality of apertures, one in communication with each of said chutes for affording access for the bees into the beehive.

2. A device for maintaining a plurality of beehives in a relative rigid position comprising a trough-like structure including a bottom wall and a pair of spaced substantially parallel vertical walls extending upwardly from said bottom wall, a plurality of beehives adapted to be positioned in spaced relation upon said bottom wall and within said vertical walls, and packing between said beehives and said two vertical walls for maintaining said beehives in a rigid relative position with respect to said bottom wall and said vertical walls and for providing insulation for said beehives, each of said beehives being provided with a chute contacting with one of said vertical walls, said latter wall being provided with a plurality of apertures, one in communication with each of said chutes for affording entrance of the bees into the beehive.

3. In a vehicle, a beehive positioned therewithin and having its front wall in spaced relation with one wall of the vehicle, and a chute extending forwardly from the front wall of said beehive and in contact with the said wall of the vehicle, a ledge positioned in front of said front wall and covering the top of said chute, the said wall of the vehicle being provided with an aperture communicating with said chute for affording entrance of the bees to the beehive, and packing above said ledge and completely filling the space between said vehicle wall and said front wall of the beehive.

4. In combination with a structure including a floor and side wall extending upwardly therefrom, a purality of beehives arranged in a row upon said floor and adjacent said wall, said beehives having their side walls in spaced relation with each other and their front walls spaced from said side wall of the structure, a board extending from said floor and in spaced relation with the rear walls of said beehives, and packing disposed between the adjacent beehives and between the front walls of said beehives and said side wall of the structure and between the rear walls of said beehives and said board so as to maintain said beehives in a stationary rigid position with respect to said side wall of the structure and said board and with respect to each other, said side wall of the structure being provided with a plurality of apertures one communicating with each of said beehives for affording access for the bees thereto.

5. A device for maintaining a plurality of beehives in a relative rigid position comprising a trough-like structure including a bottom wall and a pair of spaced substantially parallel vertical walls extending upwardly from said bottom wall, a plurality of beehives positioned in spaced relation upon said bottom wall and between said vertical walls, and means for maintaining said beehives in a rigid stationary position spaced from said vertical walls and from each other, each of said beehives being provided with a communicating passage through one of said vertical walls for affording entrance of the bees to the beehives.

THEODORE TURCHENKO.